US009785586B2

(12) United States Patent
Kurihara et al.

(10) Patent No.: US 9,785,586 B2
(45) Date of Patent: Oct. 10, 2017

(54) ELECTRONIC COMPUTER AND INTERRUPT CONTROL METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP); Hiromasa Yamauchi, Usakos (NA); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 482 days.

(21) Appl. No.: 14/266,601

(22) Filed: Apr. 30, 2014

(65) Prior Publication Data
US 2014/0237150 A1    Aug. 21, 2014

Related U.S. Application Data

(63) Continuation of application No. PCT/JP2011/076095, filed on Nov. 11, 2011.

(51) Int. Cl.
*G06F 13/26* (2006.01)
*G06F 13/24* (2006.01)
(Continued)

(52) U.S. Cl.
CPC ............ *G06F 13/26* (2013.01); *G06F 9/4812* (2013.01); *G06F 9/5083* (2013.01)

(58) Field of Classification Search
CPC ............ G06F 13/24; G06F 13/26; G06F 9/46
See application file for complete search history.

(56) References Cited

U.S. PATENT DOCUMENTS 7,054,972 B2 *   5/2006   Parry ...................... G06F 13/24
                                                        710/260
7,950,013 B2 *   5/2011   Sato ...................... G06F 9/4881
                                                        710/260
(Continued)

FOREIGN PATENT DOCUMENTS

JP       55-085940 A     6/1980
JP       04-178869 A     6/1992
(Continued)

OTHER PUBLICATIONS

Japanese Office Action for Japanese Application No. 2013-542793 dated May 12, 2015 (partial translation of relevant portion).
(Continued)

*Primary Examiner* — Henry Tsai
*Assistant Examiner* — Christopher a Daley
(74) *Attorney, Agent, or Firm* — Arent Fox LLP

(57) ABSTRACT

An electronic computer includes a processor that executes a thread and an interrupt handler, and monitors load of the processor; and an interrupt controller that is configured to determine a notification timing for an interrupt request to call the interrupt handler, the notification timing being determined based on the load and an effect of execution of the interrupt handler on user performance of the thread under execution by the processor; and notify the processor of the interrupt request, based on the notification timing. When the load is higher than a threshold, the interrupt controller sets the notification timing for an interrupt request that does not affect the user performance, to be later than the notification timing for an interrupt request that affects the user performance. Based on notification of the interrupt request, the processor calls and executes the interrupt handler that corresponds to the interrupt request.

9 Claims, 10 Drawing Sheets

(51) Int. Cl.
*G06F 9/48* (2006.01)
*G06F 9/50* (2006.01)
*G06F 9/46* (2006.01)

(56) References Cited

U.S. PATENT DOCUMENTS

| | | | | |
|---|---|---|---|---|
| 9,164,935 B2* | 10/2015 | Klein | ............... | G06F 13/24 |
| 2004/0236875 A1* | 11/2004 | Jinzaki | ............... | G06F 9/4812 710/15 |
| 2005/0182879 A1* | 8/2005 | Vu | ............... | G06F 13/24 710/260 |
| 2005/0246465 A1* | 11/2005 | Wright | ............... | G06F 13/24 710/260 |
| 2006/0064520 A1* | 3/2006 | Anand | ............... | G06F 13/24 710/52 |
| 2009/0089470 A1* | 4/2009 | Ven | ............... | G06F 13/24 710/260 |
| 2011/0145461 A1* | 6/2011 | Zhao | ............... | G06F 9/4812 710/267 |

FOREIGN PATENT DOCUMENTS

| | | |
|---|---|---|
| JP | 06-028321 A | 2/1994 |
| JP | 10-055282 A | 2/1998 |
| JP | 2000-122963 A | 4/2000 |
| JP | 2007-140791 A | 6/2007 |
| JP | 2007-172322 A | 7/2007 |
| JP | 2008-015883 A | 1/2008 |
| JP | 2010-277422 A | 12/2010 |
| WO | 03/063002 A1 | 7/2003 |

OTHER PUBLICATIONS

International Search Report, Japanese Patent Application No. PCT/JP2011/076095 dated Jan. 10, 2012.

* cited by examiner

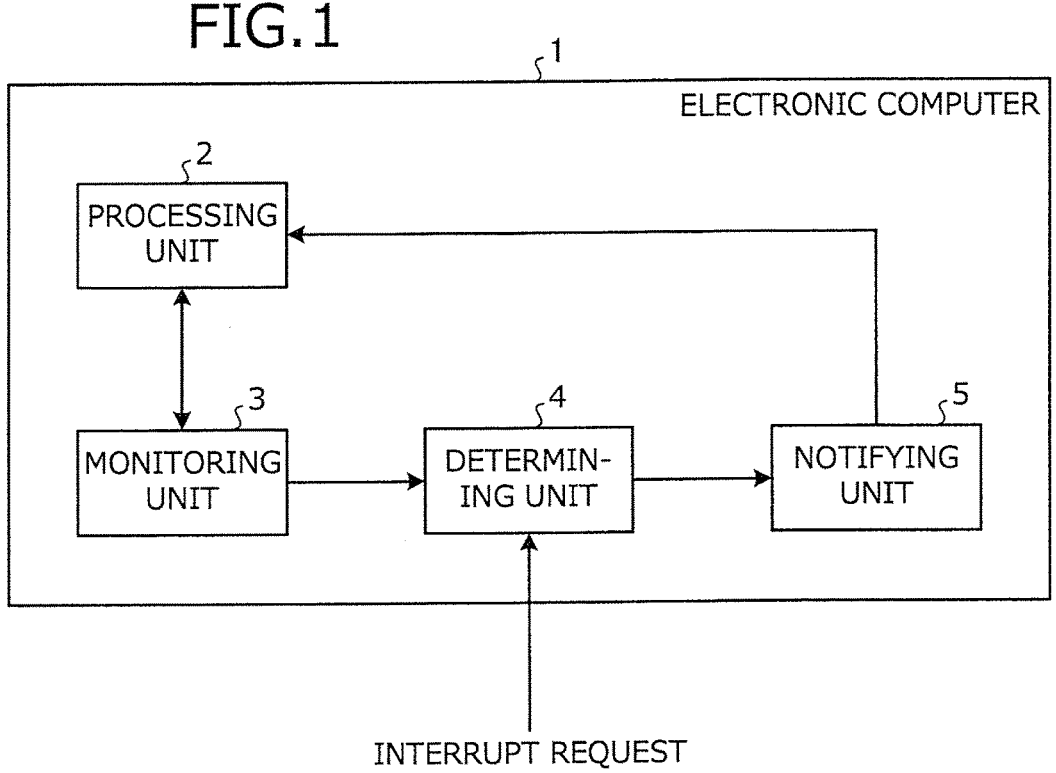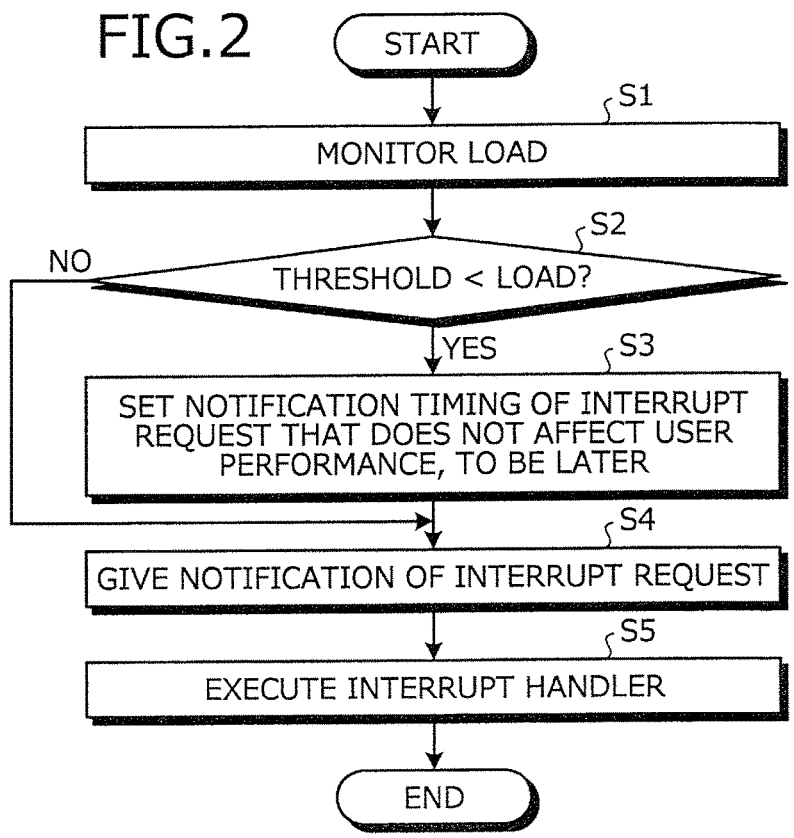

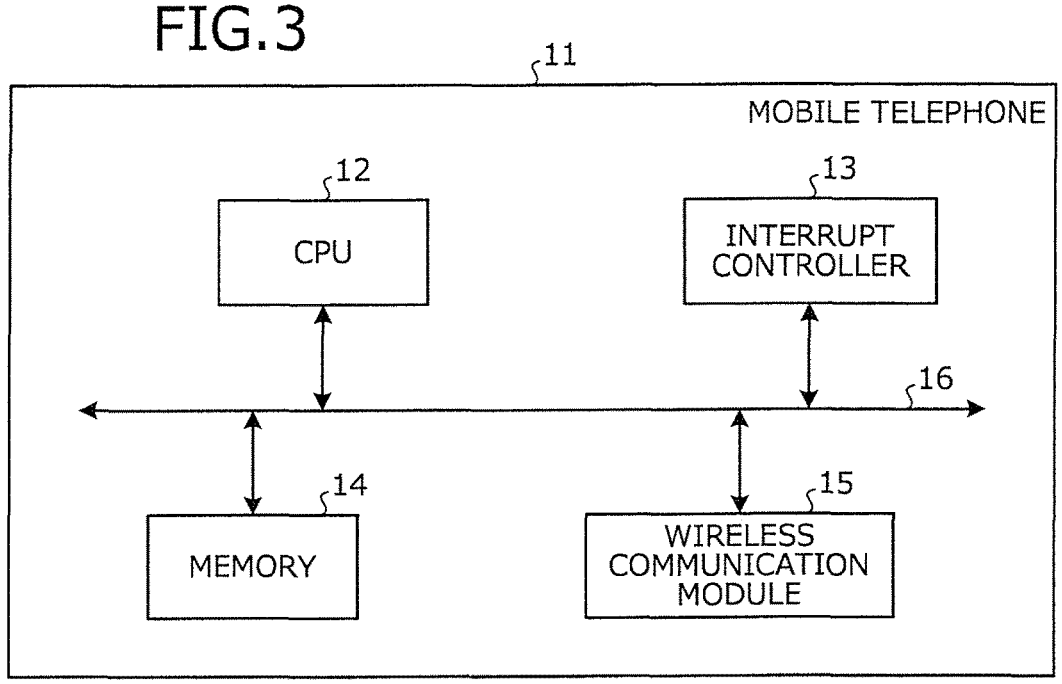

FIG.5

| THREAD | INTERRUPT PROCESS ID |
|---|---|
| A | KEY INPUT |
| | SIGNAL DETECTION |
| | ⋮ |
| B | KEY INPUT |
| | ⋮ |
| C | KEY INPUT |
| | ⋮ |
| D | KEY INPUT |
| | ⋮ |

| INTERRUPT PROCESS ID | STANDARD PROCESS PERIOD |
|---|---|
| KEY INPUT | 0.25 ms |
| SIGNAL DETECTION | 0.5 ms |
| REMAINING BATTERY LEVEL DETECTION | 0.5 ms |
| CARD INSERTION/ REMOVAL | 0.5 ms |
| ⋮ | ⋮ |

26

| INTERRUPT PROCESS ID | PRIORITY LEVEL | WORST EXECUTION PERIOD | ESTIMATED PROCESS PERIOD |
|---|---|---|---|
| KEY INPUT | FAST | 1 ms | 0.5 ms |
| SIGNAL DETECTION | FAST | 5 ms | 2.5 ms |

| INTERRUPT PROCESS ID | PRIORITY LEVEL | WORST EXECUTION PERIOD | ESTIMATED PROCESS PERIOD |
|---|---|---|---|
| KEY INPUT | FAST | 1 ms | 0.7 ms |
| SIGNAL DETECTION | SLOW | 5 ms | 2.9 ms |

FIG.13

| INTERRUPT PROCESS ID | PRIORITY LEVEL | WORST EXECUTION PERIOD | ESTIMATED PROCESS PERIOD |
|---|---|---|---|
| KEY INPUT | FAST | 1 ms | 0.25 ms |
| SIGNAL DETECTION | FAST | 1 ms | 0.5 ms |
| REMAINING BATTERY LEVEL DETECTION | SLOW | 1 ms | 0.5 ms |

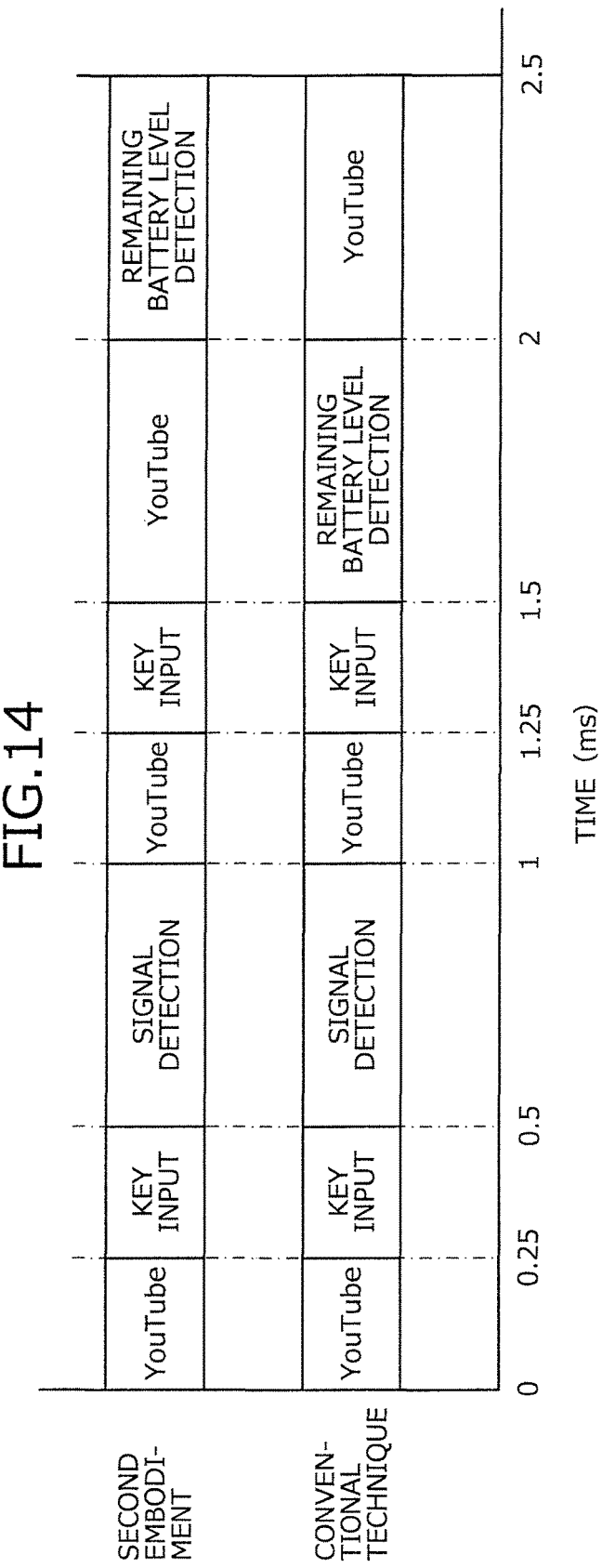

ELECTRONIC COMPUTER AND INTERRUPT CONTROL METHOD

CROSS REFERENCE TO RELATED APPLICATIONS

This application is a continuation application of International Application PCT/JP2011/076095, filed on Nov. 11, 2011 and designating the U.S., the entire contents of which are incorporated herein by reference.

FIELD

The embodiments discussed herein are related to an electronic computer and an interrupt control method.

BACKGROUND

In one conventional system, a master apparatus that has received from a slave apparatus, an interrupt signal that is generated only when a particular interrupt event has occurred, executes a corresponding process particular to the interrupt event, without confirming the event causing the interrupt with respect to the slave apparatus (see, for example, Japanese Laid-Open Patent Publication No. 2008-15883). According to one method, an interrupt privilege is sequentially granted to processors and the processor retaining the interrupt privilege performs processing with respect to an interrupt request (see, for example, Japanese Laid-Open Patent Publication No. H6-28321). According to another method, the addresses of multiple processing apparatuses are registered into a register and when an interrupt occurs, the register is referred to and an interrupt is assigned to a relevant processing apparatus (see, for example, Japanese Laid-Open Patent Publication No. S55-85940).

According to a further method, interrupt processing is performed by a processor having the lowest power consumption among processors whose power consumption is within a threshold range (see, for example, Japanese Laid-Open Patent Publication No. 2007-172322). According to still another method, interrupt request signals are ranked according to priority and according to the operation state of a central processing unit (CPU), an interrupt request output signal is input to the CPU, whereby the CPU is caused to execute processing, starting from an interrupt event having a high priority (see, for example, Japanese Laid-Open Patent Publication No. 2000-122963).

According to another method, when the number of events per unit time causing interrupt exceeds a permitted count, no processing is performed for any of the interrupt causing events (see, for example, Japanese Laid-Open Patent Publication No. H10-55282). According to yet another method, when an interrupt occurs, the priority of processors to receive an interrupt request is determined and from the execution level of the processors, whether a processor is to receive an interrupt request is determined (see, for example, Japanese Laid-Open Patent Publication No. H4-178869).

Nonetheless, with the conventional methods, when an interrupt request occurs, the CPU immediately suspends processing a thread under execution and performs interrupt processing. Therefore, when the load of the CPU is large and interrupt processing occurs frequently, problems arise such as delays in the processing of the user application and situations where user performance drops consequent to interrupt processing related to user performance of the user application not being implemented.

Examples of user performance include the time consumed to respond to a key strike on a keyboard used as an input apparatus of an electronic computer, the response of a touch panel when a touch panel is used, the time consumed to download data, etc. A further example of user performance is performance related to signal detection for an application performing wireless communication when the electronic computer performs wireless communication.

SUMMARY

According to an aspect of an embodiment, an electronic computer includes a processor that executes a thread and an interrupt handler, and is configured to monitor load of the processor; and an interrupt controller that is configured to determine a notification timing for an interrupt request to call the interrupt handler, the notification timing being determined based on the load and an effect of execution of the interrupt handler on user performance of the thread under execution by the processor; and notify the processor of the interrupt request, based on the notification timing. Then the load is higher than a threshold, the interrupt controller sets the notification timing for an interrupt request that does not affect the user performance, to be later than the notification timing for an interrupt request that affects the user performance. Based on notification of the interrupt request, the processor calls and executes the interrupt handler that corresponds to the interrupt request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of an electronic computer according to a first embodiment;

FIG. 2 is a flowchart of an interrupt control method according to the first embodiment;

FIG. 3 is a block diagram of a hardware configuration of a mobile telephone according to a second embodiment;

FIG. 5 is a table depicting an example of thread information for the mobile telephone according to the second embodiment;

FIG. 6 is a table depicting an example of interrupt process information for the mobile telephone according to the second embodiment;

FIG. 13 is a table depicting an example of the interrupt determination table in the mobile telephone according to the second embodiment; and FIG. 14 is a diagram depicting a comparison example of the second embodiment and a conventional technique.

DESCRIPTION OF EMBODIMENTS

Figure 4:
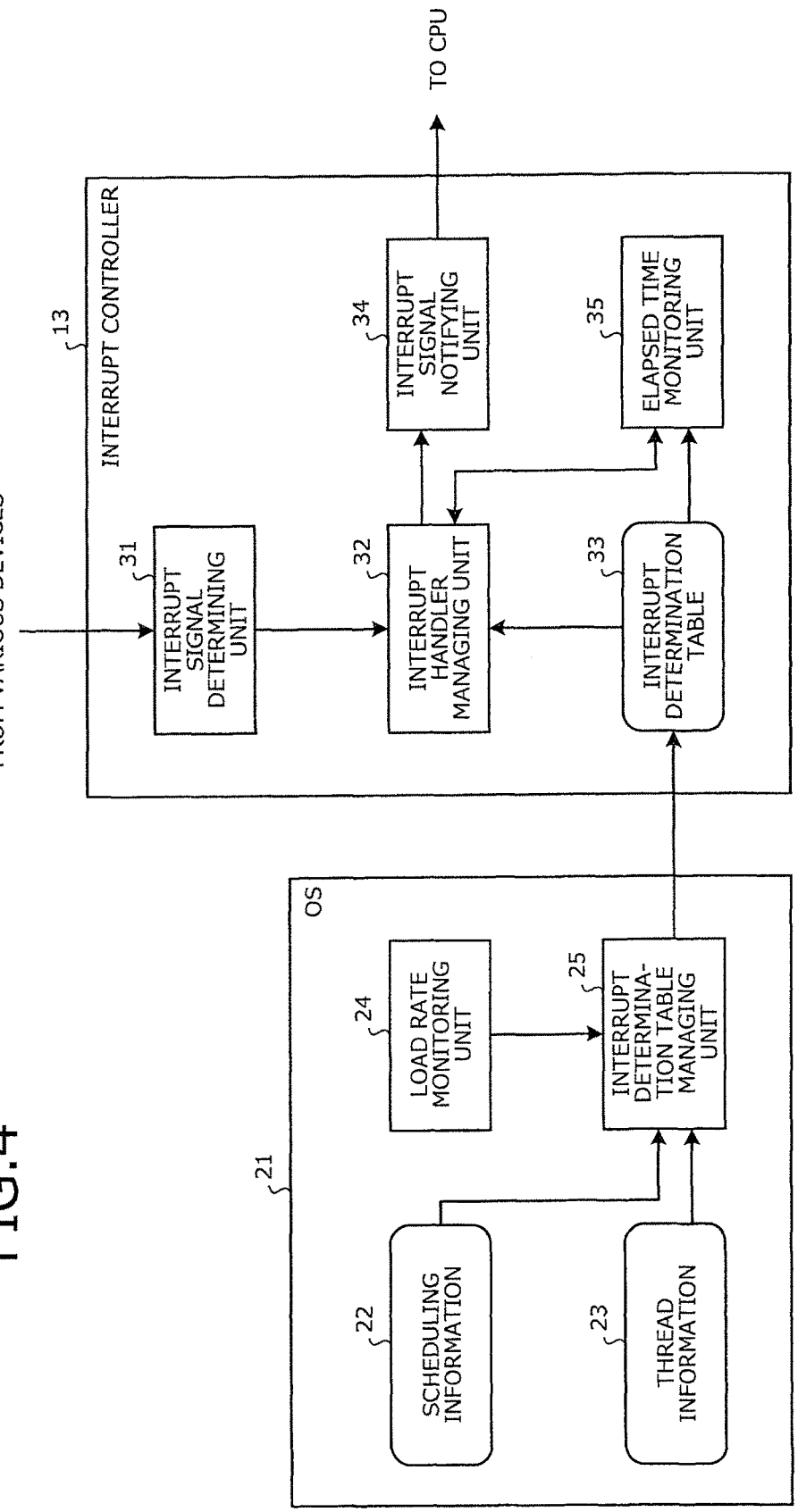
FIG. 4 is a block diagram of a functional configuration of the mobile telephone according to the second embodiment.

FIG. 1 is a block diagram of an electronic computer according to a first embodiment. As depicted in FIG. 1, an electronic computer 1 includes a processing unit 2, a monitoring unit 3, a determining unit 4, and a notifying unit 5. The processing unit 2 executes threads and an interrupt handler. Here, a program on an operating system (OS) supporting parallel processing is executed in units of threads. If threads are of the same process, the memory space of the threads is shared. The interrupt handler is a process that is performed immediately when a kernel receives an interrupt and is usually performed preferentially before processes and threads of an application. The monitoring unit 3 monitors the load of the processing unit 2. The load of the processing unit 2 may be the total computing amount of the threads assigned to the processing unit 2.

The determining unit 4, based on the load of the processing unit 2 and the effect of execution of the interrupt handler on user performance of the thread under execution by the processing unit 2, determines a notification timing for the interrupt request that calls the interrupt handler. For example, when the load of the processing unit 2 is higher than a threshold, the determining unit 4 sets the notification timing of a request for an interrupt that does not affect user performance, to be later than the notification timing of a request for an interrupt that affects user performance.

The notifying unit 5 notifies the processing unit 2 of the interrupt request, according to the determined notification timing. Based on the notification of the interrupt request, the processing unit 2 calls and executes the interrupt handler that corresponds to the interrupt request.

FIG. 2 is a flowchart of an interrupt control method according to the first embodiment. As depicted in FIG. 2, when the interrupt control method is started by the electronic computer 1, the monitoring unit 3 monitors the load of the processing unit 2 (step S1). When an interrupt request occurs, the determining unit 4 determines the notification timing for the interrupt request, based on the load of the processing unit 2 and the effect of the execution of the interrupt handler called by the interrupt request on user performance of the thread under execution by the processing unit 2.

For example, if the load of the processing unit 2 is higher than a threshold (step S2: YES), the determining unit 4 sets the notification timing of a request for an interrupt that does not affect user performance, to be later than the notification timing of a request for an interrupt that affects user performance (step S3). On the other hand, if the load of the processing unit 2 is not higher than the threshold (step S2: NO), the operation at step S3 is skipped.

The notifying unit 5 notifies the processing unit 2 of the interrupt request, based on the determined notification timing (step S4). Based on the notification of the interrupt request, the processing unit 2 calls and executes the interrupt handler that corresponds to the interrupt request (step S5), ending a series of operations of the interrupt control method. The operations at steps S1 to S5 are performed each time an interrupt request occurs.

According to the first embodiment, when the load of the processing unit 2 is high, processing for an interrupt that does not affect user performance is executed at a later timing than processing for an interrupt that affects user performance. In other words, when the load of the processing unit 2 is high, frequent occurrence of interrupt processing can be prevented. Therefore, drops in user performance such as the occurrence of delays in the processing of a user application and failures to implement interrupt processing related to user performance of the user application, when the load of the processing unit 2 becomes high, can be prevented.

The second embodiment is an example of application of the electronic computer of the first embodiment to a mobile telephone. Here, mobile telephones include portable terminals equipped with a wireless communication function such as so called smartphones. Without limitation to a mobile telephone, the electronic computer according to the first embodiment is further applicable to a base station of mobile telephone system.

FIG. 3 is a block diagram of a hardware configuration of the mobile telephone according to the second embodiment. As depicted in FIG. 3, a mobile telephone 11 includes a central processing unit (CPU) 12 as the processing unit, an interrupt controller 13, memory 14, and a wireless communication module 15. The CPU 12, the interrupt controller 13, the memory 14, and the wireless communication module 15 are respectively connected by a bus 16.

The CPU 12 executes OSs and threads of application programs. Each thread is queued in a run queue (not depicted) until the thread is to be processed by the CPU 12. Further, when an interrupt request from a peripheral device (not depicted) is input into the interrupt controller 13, the CPU 12 calls and executes an interrupt handler that corresponds to the interrupt request.

The interrupt controller 13 detects interrupt requests input from various devices. When the load of the processing unit 2 is higher than a threshold, the interrupt controller 13 notifies the CPU 12 of an interrupt signal that calls processing for an interrupt that does not affect user performance of the thread under execution by the CPU 12, at a later timing than that for an interrupt signal that calls processing for an interrupt that affects user performance.

The memory 14 includes, for example, volatile memory such as random access memory (RAM) and non-volatile memory such as read-only memory (ROM). RAM, for example, may be used a work area of the CPU 12. ROM, for example, may store OSs and application programs.

The wireless communication module 15 wirelessly communicates with a base station of a mobile telephone system. The wireless communication module 15 may wirelessly communicate with a base station of a World Interoperability for Microwave Access (WiMAX, registered trademark) system, an access point of a Wireless Fidelity (Wi-Fi, registered trademark) system, etc.

FIG. 4 is a block diagram of a functional configuration of the mobile telephone according to the second embodiment. As depicted in FIG. 4, an OS 21 is executed by the CPU 12, whereby scheduling information 22, thread information 23, a load rate monitoring unit 24 as an example of the monitoring unit, and for example, an interrupt determination table managing unit 25 as a managing unit are implemented.

The scheduling information 22 may include the execution state of threads at the CPU 12, information related to the assignment of threads to the CPU 12, etc. The scheduling information 22 is obtained from a scheduler (not depicted) implemented by the OS 21. The thread information 23 may include for each thread, interrupt processing information related to user performance. The thread information 23 will be described hereinafter.

The load rate monitoring unit 24 monitors the load rate of the CPU 12, for example, at constant intervals. The load rate monitoring unit 24 notifies the interrupt determination table managing unit 25 of the load rate of the CPU 12.

The interrupt determination table managing unit 25 updates an interrupt determination table 33, based on the scheduling information 22, the load rate of the CPU 12, and the thread information 23 related to the thread under execution by the CPU 12. For example, when the load rate of the CPU 12 is higher than a threshold, the interrupt determination table managing unit 25 may set the priority of processing for an interrupt that does not affect user performance to be lower than the priority of processing for an interrupt that affects user performance. A load rate threshold will be described hereinafter.

The interrupt determination table 33, for example, may be provided at the interrupt controller 13. The interrupt determination table managing unit 25 may update the interrupt determination table 33 at the task dispatch timing. Here, a task is one batch of work from the perspective of the user and further has the meaning of process and thread. Here, task has the same meaning as thread.

The interrupt controller 13 may include an interrupt signal determining unit 31, an interrupt handler managing unit 32 as an example of the determining unit, the interrupt determination table 33, an interrupt signal notifying unit 34 as an example of the notifying unit, and an elapsed time monitoring unit 35 as a timer unit. The interrupt signal determining unit 31 detects interrupt requests from various devices and determines from which device an interrupt request is received. The interrupt signal determining unit 31 notifies the interrupt handler managing unit 32 of the detected interrupt request.

The interrupt handler managing unit 32 determines whether an interrupt request from the interrupt signal determining unit 31 is be immediately sent to the CPU 12 as an interrupt signal. The interrupt handler managing unit 32 may determine whether an interrupt signal is to be sent immediately to the CPU 12, based on the interrupt determination table 33. Upon determining that an interrupt signal is to be sent immediately to the CPU 12, the interrupt handler managing unit 32 notifies the interrupt signal notifying unit 34 of the interrupt process that corresponds to the interrupt request from the interrupt signal determining unit 31.

Upon determining that an interrupt signal is not to be sent immediately to the CPU 12, the interrupt handler managing unit 32 notifies the elapsed time monitoring unit 35 of the interrupt process that corresponds to the interrupt request from the interrupt signal determining unit 31. The interrupt handler managing unit 32, upon receiving notification from the elapsed time monitoring unit 35, determines that the CPU 12 is to be notified immediately of the interrupt process by an interrupt signal. The interrupt handler managing unit 32 notifies the interrupt signal notifying unit 34 of the interrupt process notified by the elapsed time monitoring unit 35.

The interrupt determination table 33 may include information such as interrupt process identifier (ID), priority level, worst execution period, and estimated process period. From the interrupt process ID, interrupt processes can be respectively identified. The priority level may be indicated by, for example, two values: "fast" and "slow".

When the priority level is "fast", the interrupt handler managing unit 32 may determine that an interrupt signal is to be sent immediately to the CPU 12. When the priority level is "slow", the interrupt handler managing unit 32 may determine that no interrupt signal is to be sent immediately to the CPU 12. From the worst execution period information, the processing time required for the interrupt process to meet system conditions can be known for each interrupt process.

From the estimated process period information, the time estimated to be required for an interrupt process, from the time that the CPU 12 receives an interrupt signal, is known. The estimated process period when the load rate is A (0≤A≤100) can be obtained by F(A), using an equation F(x) obtained from a curve characterizing user performance (refer to description of the load rate threshold, hereinafter).

The interrupt determination table 33 may be provided in the memory 14 (refer to FIG. 3). Here, the interrupt determination table 33 is assumed to be provided at the interrupt controller 13. The interrupt determination table 33 will be described hereinafter.

The elapsed time monitoring unit 35 begins measuring time upon receiving notification of an interrupt process from the interrupt handler managing unit 32, and monitors the time that elapses after the notification is received. The elapsed time monitoring unit 35 may begin measuring time when the elapsed time monitoring unit 35 receives the notification, when an interrupt request is input into the interrupt signal determining unit 31, or when the interrupt handler managing unit 32 determines that no interrupt signal is to be sent immediately to the CPU 12.

When a given period of time has elapsed, the elapsed time monitoring unit 35 notifies the interrupt handler managing unit 32 of such. For example, when the elapsed time is equivalent to the worst execution period less the estimated process period, the elapsed time monitoring unit 35 may notify the interrupt handler managing unit 32. In other words, when the load rate of the CPU 12 is higher than a threshold, the interrupt handler managing unit 32 can determine based on the worst execution period and the estimated process period, the timing at which an interrupt signal that corresponds to processing for an interrupt that does not affect user performance is to be sent to the CPU 12.

The interrupt signal notifying unit 34, upon receiving notification from the interrupt handler managing unit 32, sends to the CPU 12, an interrupt signal corresponding to the notification.

FIG. 5 is a table depicting an example of the thread information for the mobile telephone according to the second embodiment. As depicted in FIG. 5, the thread information 23 includes for each thread (e.g., A, B, C, and D), information concerning processing for interrupts that affect user performance. In the example, although "key input" and "signal detection" are indicated as interrupt process IDs, interrupt process IDs may be, for example, the number of the terminal that input the interrupt request from the various devices, the terminals being disposed in the interrupt controller 13.

FIG. 6 is a table depicting an example of interrupt process information for the mobile telephone according to the second embodiment. As depicted in FIG. 6, interrupt process information 26 includes information concerning the standard process period required for each interrupt process. The interrupt process information 26 may be included in the thread information 23 as additional information. The process period required in a case of performing an interrupt process when the load rate of the CPU 12 is 0 may be used as the standard process period for the interrupt process. For example, the process period required for an interrupt process when the load rate of the CPU 12 is 0, obtained by simulation may be used as the standard process period. For example, the standard process period for an interrupt process for "key input" may be 0.25 ms and the standard process period for an interrupt process for signal detection may be 0.5 ms. Nonetheless, the standard process periods are not limited to these values.

Figures 7, 8, 9:
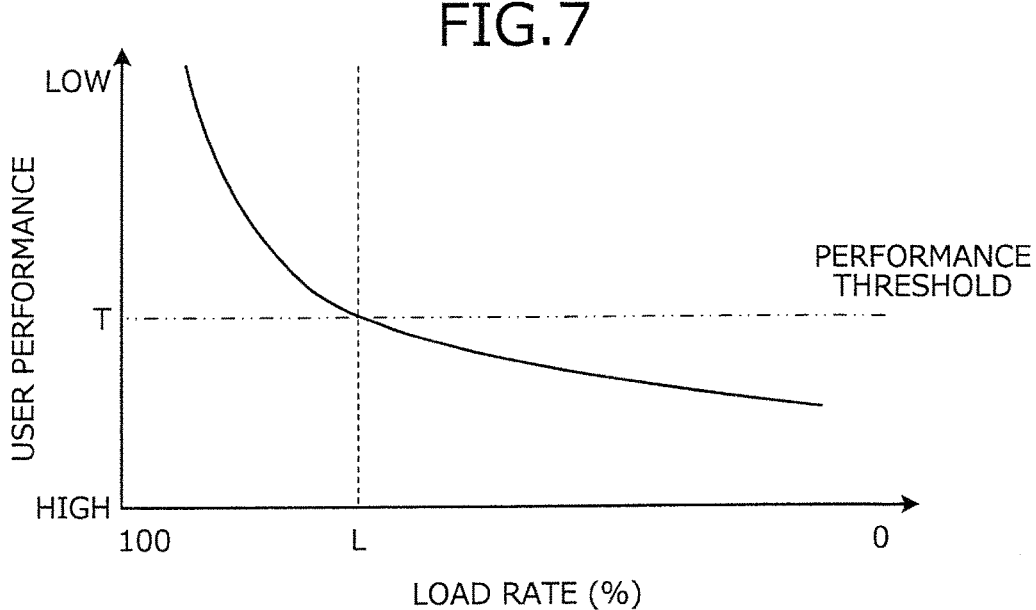
FIG. 7 is a graph of depicting an example of the relationship between user performance and load rate in the mobile telephone according to the second embodiment.
FIGS. 8 and 9 are tables depicting examples of an interrupt determination table of the mobile telephone according to the second embodiment.

FIG. 7 is a graph of depicting an example of the relationship between user performance and load rate in the mobile telephone according to the second embodiment. As depicted in FIG. 7, when the load rate of the CPU 12 decreases, the user performance increases; and when the load rate of the CPU 12 increases, the user performance decreases. Examples of user performance may include the time consumed to respond to a key strike on the keyboard, the response of the touch panel, the time consumed to download data, etc.

When the user performance is high, the key response time and/or the data download time decreases and the response of the touch panel becomes favorable. When the user performance is low, the key response time and/or the data download time increase and the response of the touch panel becomes poor.

For example, curves characterizing user performance such as that depicted in FIG. 7 may be obtained by simulation. From the user performance curve, equation F(x) above can be obtained. When the user performance is, for example, the response time for a key strike, a performance threshold T may be the period of time elapsing until the user begins to feel irritated consequent to the time that passes after the user strikes a key until the operation resulting from the key strike is implemented. The load rate L at the performance threshold T may be used as the load rate threshold of the CPU 12.

FIGS. 8 and 9 are tables depicting examples of the interrupt determination table of the mobile telephone according to the second embodiment. In the example depicted in FIG. 9, the load rate of the CPU 12 is higher than that in the example depicted in FIG. 8.

For example, in the example depicted in FIG. 8, for an interrupt process whose interrupt process ID is "key input", the priority level is "fast", the worst execution period is 1 ms, and the estimated process period is 0.5 ms. Further, for an interrupt process whose interrupt process ID is "signal detection", the priority level is "fast", the worst execution period is 5 ms, and the estimated process period is 2.5 ms.

The priority level and the estimated process period vary according to the load rate of the CPU 12. For instance, in the example depicted in FIG. 9, for the interrupt process whose interrupt process ID is "key input", although the priority level is "fast", the estimated process period is 0.7 ms. Further, for the interrupt process whose interrupt process ID is "signal detection", the priority level is "slow", and the estimated process period has increased to 2.9 ms.

The example depicted in FIG. 8 may be taken as an example where the load rate of the CPU 12 is lower than the load rate L on the user performance characterizing curve depicted in FIG. 7. In this case, upon detecting an interrupt request, the interrupt controller 13 may immediately send an interrupt signal to the CPU 12.

Further, the example depicted in FIG. 9 may be taken as an example where the load rate of the CPU 12 is higher than the load rate L on the user performance characterizing curve depicted in FIG. 7. In this case, upon detecting an interrupt request, the interrupt controller 13 may immediately send an interrupt signal to the CPU 12 for an interrupt request whose priority level is "fast". For an interrupt request whose priority level is "slow", an interrupt signal need not be immediately sent to the CPU 12. In other words, the interrupt controller 13 may delay the sending of an interrupt signal to the CPU 12.

For instance, in the example depicted in FIG. 9, the CPU 12 is assumed to be processing an application program such as a game that does not perform communication. In this case, an interrupt process for "signal detection" does not affect the user performance of the application under execution. Accordingly, the priority level of the interrupt process for "signal detection" is "slow". The worst execution period for the interrupt process for "signal detection" is, for example, 5 ms and the estimated process period is, for example, 2.9 ms; and therefore, when the elapsed time monitored by the elapsed time monitoring unit 35 reaches 2.1 ms(=5[ms]−2.9 [ms]), the interrupt controller 13 may send an interrupt signal to the CPU 12.

Figure 10:
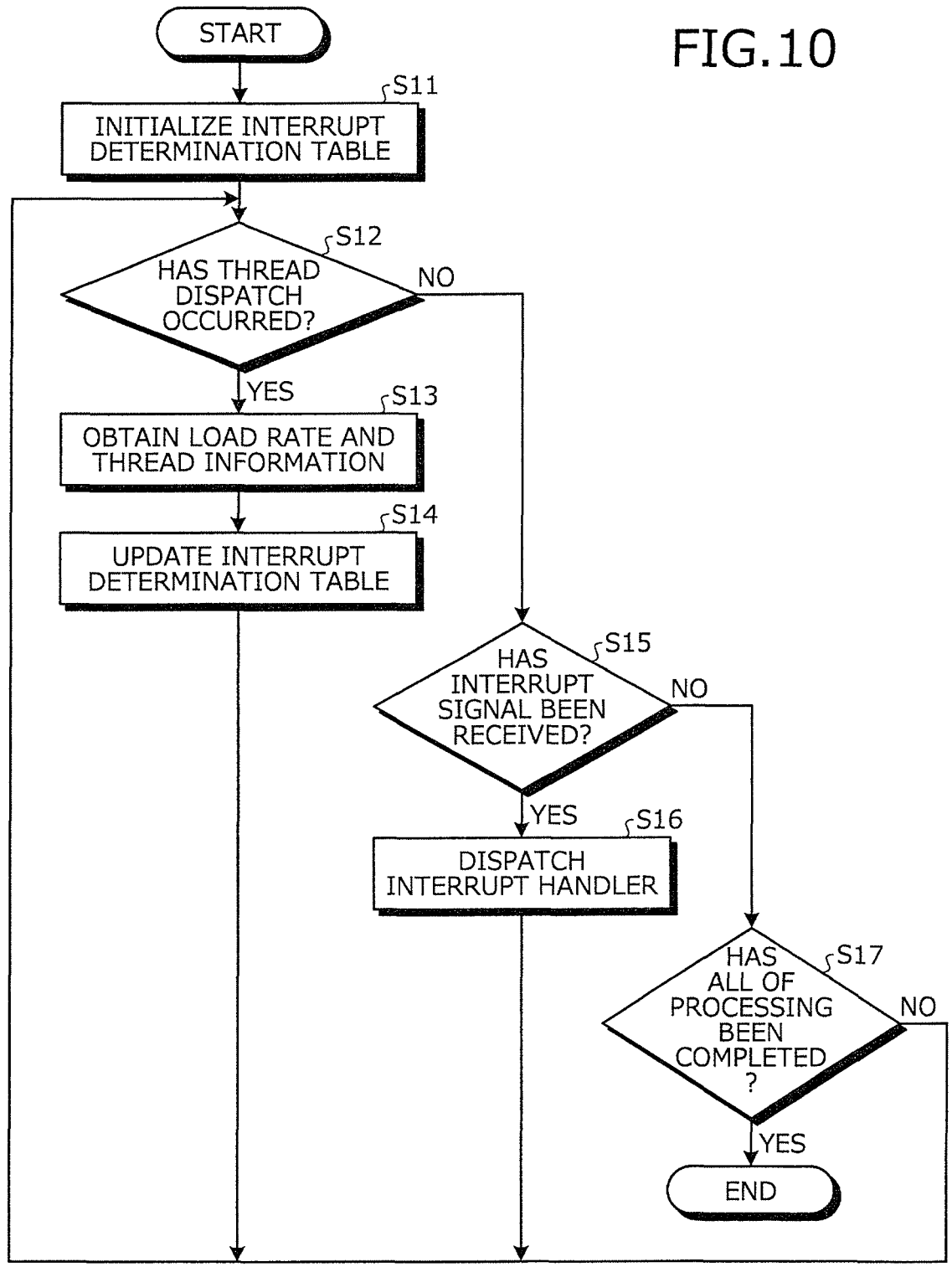
FIG. 10 is a flowchart depicting a process procedure performed by an OS of the mobile telephone according to the second embodiment.

FIG. 10 is a flowchart depicting a process procedure performed by the OS of the mobile telephone according to the second embodiment. As depicted in FIG. 10, when processing by the OS 21 begins, the interrupt determination table managing unit 25 initializes the interrupt determination table 33 (step S11).

Consequent to initialization, information including the interrupt process ID, the priority level, the worst execution period, and the estimated process period is registered for each interrupt process, into the interrupt determination table 33. The initial priority level setting for all of the interrupt processes may be "fast". The initial estimated process period setting may be the respective standard process periods for the interrupt processes. The interrupt determination table managing unit 25 can obtain the standard process periods for each interrupt process from the thread information 23.

If thread dispatch has occurred (step S12: YES), the interrupt determination table managing unit 25 obtains the load rate of the CPU 12 from the load rate monitoring unit 24. The interrupt determination table managing unit 25 further obtains the thread information 23 that corresponds to the dispatched thread (step S13). From the scheduling information 22, the interrupt determination table managing unit 25 is able to know which thread has been dispatched.

The interrupt determination table managing unit 25 updates the interrupt determination table 33, based on the load rate of the CPU 12 and the thread information 23 obtained at step S13 (step S14), and the flow returns to step S12. Details of a process of updating the interrupt determination table 33 will be described hereinafter. When the priority levels in the interrupt determination table 33 are updated, the load rate threshold for the CPU 12 is necessary. The load rate threshold for the CPU 12 may be obtained from a user performance characterizing curve such as that depicted in FIG. 7, preliminarily obtained by simulation.

On the other hand, if no thread dispatch has occurred (step S12: NO) and the CPU 12 has received an interrupt signal from the interrupt controller 13 (step S15: YES), the CPU 12 dispatches the interrupt handler that corresponds to the received interrupt signal (step S16), and the flow returns to step S12.

If the CPU 12 has not received an interrupt signal (step S15: NO) and all of the processing has been completed (step S17: YES), a series of the process ends. If all of the processing has not been completed (step S17: NO), the flow returns to step S12. Any one of the operations at step S12, step S15, and step S17 may be performed first.

Figure 11:
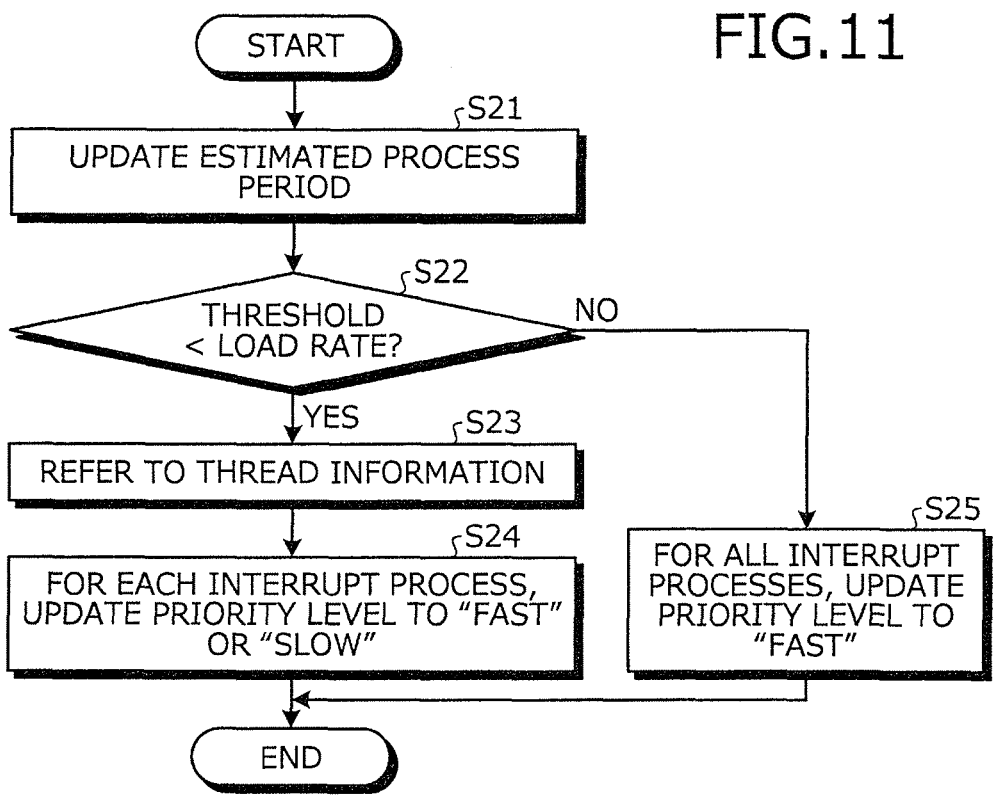
FIG. 11 is a flowchart depicting an update process procedure for the interrupt determination table in the mobile telephone according to the second embodiment.

FIG. 11 is a flowchart depicting an update process procedure for the interrupt determination table in the mobile telephone according to the second embodiment. As depicted in FIG. 11, when processing by the interrupt determination table managing unit 25 begins, the interrupt determination table managing unit 25 obtains the estimated process period, based on equation F(x) derived from the load rate of the CPU 12 and the user performance characterizing curve described above. In the interrupt determination table 33, the interrupt determination table managing unit 25 updates the estimated process period with the obtained estimated process period (step S21).

If the load rate of the CPU 12 exceeds a threshold (step S22: YES), the interrupt determination table managing unit 25 refers to the thread information 23 that corresponds to the thread under execution by the CPU 12 (step S23). The interrupt determination table managing unit 25 updates to "fast", the priority level of an interrupt process that affects user performance of the thread under execution by the CPU 12; and updates to "slow", the priority level of an interrupt process that does not affect user performance (step S24), ending a series of operations. From the thread information 23, the interrupt determination table managing unit 25 can know whether the interrupt process affects user performance.

On the other hand, if the load rate of the CPU 12 does not exceed the threshold (step S22: NO), the interrupt determination table managing unit 25 updates the priority level for each of the interrupt processes to "fast" (step S25), ending a series of operations.

Figure 12:
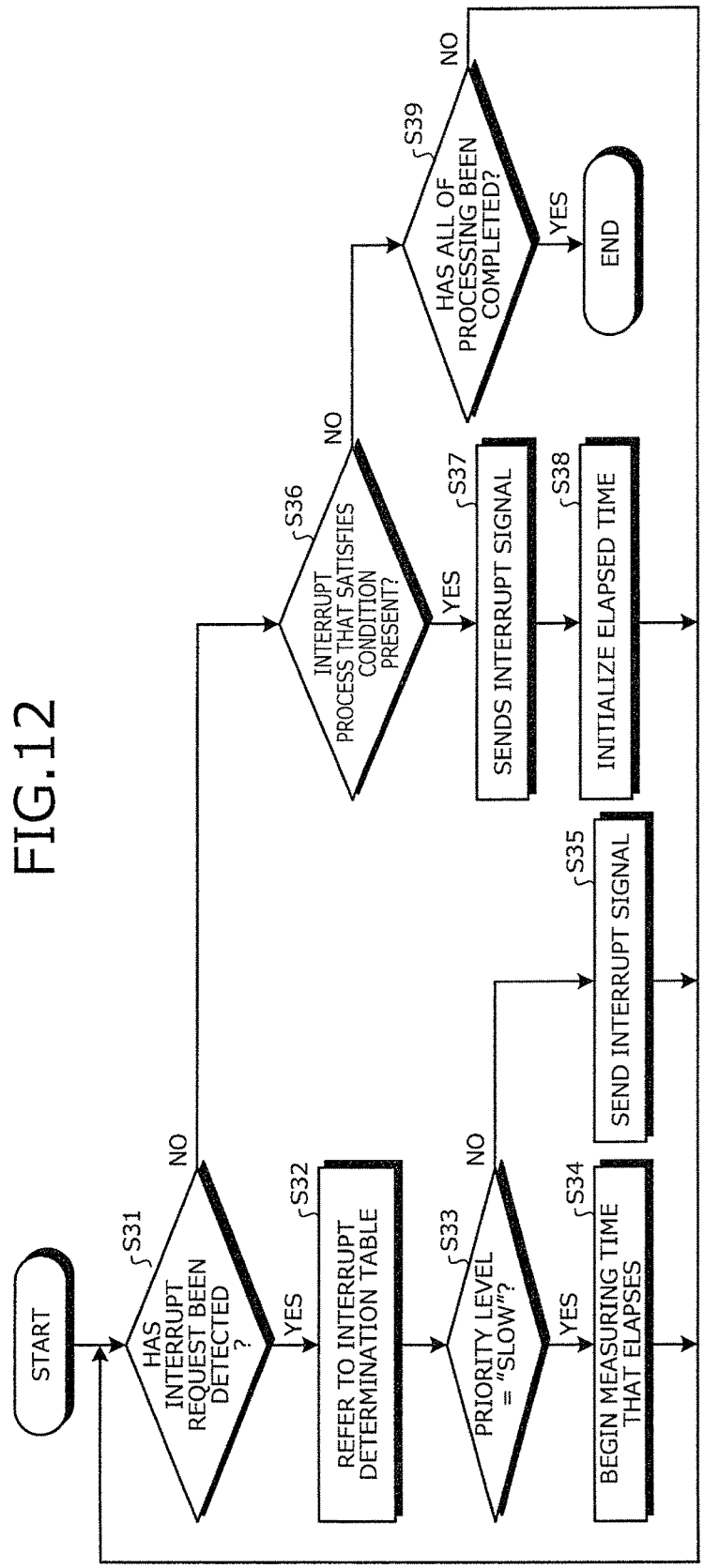
FIG. 12 is a flowchart depicting a process procedure performed by an interrupt controller in the mobile telephone according to the second embodiment.

FIG. 12 is a flowchart depicting a process procedure performed by the interrupt controller in the mobile telephone according to the second embodiment. As depicted in FIG. 12, when processing by the interrupt controller 13 begins and the interrupt signal determining unit 31 detects an interrupt request (step S31: YES), the interrupt signal determining unit 31 notifies the interrupt handler managing unit 32 of the detected interrupt request.

The interrupt handler managing unit 32, upon receiving notification from the interrupt signal determining unit 31, refers to the interrupt determination table 33 (step S32). The interrupt handler managing unit 32 refers to the priority level of the interrupt process relevant to the notification from the interrupt signal determining unit 31. If the priority level is "slow" (step S33: YES), the interrupt handler managing unit 32 notifies the elapsed time monitoring unit 35 of the interrupt process. The elapsed time monitoring unit 35, upon receiving the notification from the interrupt handler managing unit 32, begins measuring the time that elapses (step S34), and the flow returns to step S31.

On the other hand, if the priority level of the interrupt process is not "slow", i.e., is "fast" (step S33: NO), the interrupt handler managing unit 32 notifies the interrupt signal notifying unit 34 of the interrupt process relevant to the notification received from the interrupt signal determining unit 31. The interrupt signal notifying unit 34, upon receiving the notification from the interrupt handler managing unit 32, immediately sends an interrupt signal to the CPU 12 (step S35), and the flow returns to step S31.

On the other hand, if no interrupt request has been detected (step S31: NO), an interrupt process may be present that satisfies a condition that the elapsed time measured by the elapsed time monitoring unit 35 coincides with the worst execution period less the estimated process period. If an interrupt process satisfying such a condition is present (step S36: YES), the elapsed time monitoring unit 35 notifies the interrupt handler managing unit 32. The interrupt handler managing unit 32, upon receiving the notification from the elapsed time monitoring unit 35, notifies the interrupt signal notifying unit 34 of the interrupt process.

The interrupt signal notifying unit 34, upon receiving the notification from the interrupt handler managing unit 32, immediately sends an interrupt signal to the CPU 12 (step S37). The elapsed time monitoring unit 35 initializes to, for example, zero, the elapsed time of the interrupt process that corresponds to the interrupt signal sent to the CPU 12 (step S38), and the flow returns to step S31.

On the other hand, if no interrupt process is present that satisfies the condition that the elapsed time measured by the elapsed time monitoring unit 35 coincides with the worst execution period less the estimated process period (step S36: NO) and all of the processing has been completed (step S39: YES), a series of the process ends. If all of the processing has not been completed (step S39: NO), the flow returns to step S31. Any one of the operations at step S31, step S36, and step S39 may be performed first.

As one example, the second embodiment and an example of a conventional technique will be compared with reference to FIGS. 13 and 14, for a case where interrupt processes for "key input", "signal detection", and "remaining battery level detection" occur during processing for YouTube (registered trademark). In the conventional technique, when an interrupt request occurs, all interrupt processes are assumed to be immediately performed, irrespective of the load rate of the CPU and whether user performance is affected. Further, the process period for YouTube is assumed to be 1 ms. The process periods for "signal detection" and "remaining battery level detection" are respectively assumed to be 0.5 ms. Further, the information registered in the interrupt determination table 33 is assumed to be the example depicted in FIG. 13.

FIG. 13 is a table depicting an example of the interrupt determination table in the mobile telephone according to the second embodiment. As depicted in FIG. 13, in the interrupt determination table 33, the priority level of the interrupt processes for "key input" and "signal detection" is assumed to be "fast", and the priority level of the interrupt process for the "remaining battery level detection" is assumed to be "slow". The worst execution period of each of the interrupt processes is assumed to be 1 ms. The estimated process period for "key input" is assumed to be 0.25 ms, and the estimated process periods for "signal detection" and "remaining battery level detection" are assumed to be 0.5 ms, respectively.

FIG. 14 is a diagram depicting a comparison example of the second embodiment and the conventional technique. As depicted in FIG. 14, during processing for YouTube, the interrupt process for "key input" is assumed to occur when 0.25 ms have elapsed and when 1.25 ms have elapsed. Further, the interrupt process for "signal detection" is assumed to occur when 0.5 ms have elapsed; and the interrupt process for "remaining battery level detection" is assumed to occur when 1.5 ms have elapsed.

In the second embodiment, the respective interrupt processes for "key input" and "signal detection" are performed immediately upon occurrence. The interrupt process for "remaining battery level detection" is started at time point 2 ms when 0.5 ms have elapsed since the occurrence of the interrupt process, so that the processing can be completed within the worst execution period of 1 ms. Therefore, between time points 1.5 ms and 2 ms, the processing for YouTube is performed and consequently, the processing for YouTube is completed when 2 ms have elapsed from the start thereof.

On the contrary, in the conventional technique, the interrupt processes for "key input", "signal detection", and "remaining battery level detection" are performed immediately upon occurrence. Therefore, the interrupt process for "remaining battery level detection" starts at time point 1.5 ms and ends at time point 2 ms. Thereafter, the remaining processing for YouTube is performed and therefore, the processing for YouTube is completed when 2.5 ms have elapsed from the start thereof. In other words, the second embodiment completes the processing for YouTube sooner than the conventional technique does.

According to the second embodiment, the same effects of the first embodiment can be obtained. The electronic computer 1 according to the first embodiment is not limited to a mobile telephone system and is further applicable to a terminal, base station, or access point of a wireless communication system other than WiMAX and Wi-Fi; a computer such as a personal computer; a portable information terminal such as a personal digital assistant (PDA); a game console; various types of instruments; and etc.

The electronic computer and the interrupt control method enable drops in user performance resulting from the occurrence of interrupt processing to be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic computer comprising:
a processor that executes a thread and an interrupt handler, and is configured to monitor load of the processor; and
and interrupt controller that is configured to:
determine a notification timing for an interrupt request to call the interrupt handler, the notification timing being determined based on the load and an effect of execution of the interrupt handler on user performance of the thread under execution by the processor; and notify the processor of the interrupt request, based on the notification timing, wherein the interrupt controller, when the load is higher than a threshold, sets the notification timing for an interrupt request that does not affect the user performance, to be later than the notification timing for an interrupt request that affects the user performance, and the processor, based on notification of the interrupt request, calls and executes the interrupt handler that corresponds to the interrupt request,
wherein the interrupt controller, when the load is higher than the threshold, sets the notification timing for the interrupt request that affects the user performance, to be a point in time when the interrupt request occurs, and the interrupt controller, when the load is lower than the threshold, sets the notification timing for the interrupt request that does not affect the user performance and the notification timing for the interrupt request that affects the user performance, to be the point in time when the interrupt request occurs.

2. The electronic computer according to claim 1, wherein the interrupt controller sets the notification timing for the interrupt request that does not affect the user performance, to be a timing that allows execution of the interrupt handler to end at a latest allowable worst timing.

3. The electronic computer according to claim 2, further comprising:
a timer unit that measures time that elapses after occurrence of the interrupt request, wherein the interrupt controller gives notification of the interrupt request that does not affect the user performance, at a point in time when the elapsed time is equivalent to a period from the occurrence of the interrupt request until the worst timing less a process period that is for the interrupt handler and corresponds to the load.

4. The electronic computer according to claim 1, wherein the processor is further configured to manage a priority level of the notification timing for the interrupt request, based on the load, and the interrupt controller sets the notification timing for which the priority level is low, to be later than the notification timing for which the priority level is high.

5. The electronic computer according to claim 1, wherein the threshold is determined based on a load rate of the processor corresponding to the user performance.

6. An interrupt control method comprising:
monitoring load of a processor;
determining based on the load and an effect of execution of an interrupt handler on user performance of a thread under execution by the processor, a notification timing for an interrupt request that calls the interrupt handler;
setting the notification timing for an interrupt request that does not affect the user performance, to be later than the notification timing for an interrupt request that affects the user performance, when the load is higher than a threshold;
notifying the processor of the interrupt request, based on the notification timing; and
calling and executing based on notification of the interrupt request, the interrupt handler that corresponds to the interrupt request,
wherein the setting includes, when the load is higher than the threshold, setting the notification timing for the interrupt request that affects the user performance, to be a point in time when the interrupt request occurs, and the setting includes, when the load is lower than the threshold, setting the notification timing for the interrupt request that does not affect the user performance and the notification timing for the interrupt request that affects the user performance, to be the point in time when the interrupt request occurs.

7. The interrupt control method according to claim 6, wherein
the setting includes setting the notification timing for the interrupt request that does not affect the user performance, to be a timing that allows execution of the interrupt handler to end at a latest allowable worst timing.

8. The interrupt control method according to claim 7, further comprising:
measuring time that elapses after occurrence of the interrupt request, wherein
the notifying includes giving notification of the interrupt request that does not affect the user performance, at a point in time when the elapsed time is equivalent to a period from the occurrence of the interrupt request until the worst timing less a process period that is for the interrupt handler and corresponds to the load.

9. The interrupt control method according to claim 6, further comprising:
   managing a priority level of the notification timing for the interrupt request, based on the load, wherein
   the setting includes setting the notification timing for which the priority level is low, to be later than the notification timing for which the priority level is high.

* * * * *